United States Patent
Mills

(10) Patent No.: US 7,318,551 B1
(45) Date of Patent: Jan. 15, 2008

(54) Y-ADAPTER WITH EMBEDDED WIRELESS PORT

(75) Inventor: Kevin J. Mills, Palo Alto, CA (US)

(73) Assignee: Socket Communications, Inc., Newark, CA (US)

( * ) Notice: Subject to any disclaimer, the term of this patent is extended or adjusted under 35 U.S.C. 154(b) by 224 days.

(21) Appl. No.: 10/998,146

(22) Filed: Nov. 26, 2004

Related U.S. Application Data

(66) Substitute for application No. 60/555,436, filed on Mar. 23, 2004.

(60) Provisional application No. 60/526,422, filed on Dec. 2, 2003.

(51) Int. Cl.
G06K 7/06 (2006.01)

(52) U.S. Cl. ..................................... 235/441

(58) Field of Classification Search ................ 235/486, 235/487, 441, 492; 398/129, 141, 156
See application file for complete search history.

(56) References Cited

U.S. PATENT DOCUMENTS

| | | | | |
|---|---|---|---|---|
| 5,667,319 A | * | 9/1997 | Satloff | .......................... 400/472 |
| 5,890,997 A | * | 4/1999 | Roth | .............................. 482/8 |
| 5,979,766 A | | 11/1999 | Rockstein et al. | |
| 6,092,117 A | * | 7/2000 | Gladwin et al. | ............. 709/239 |
| 6,194,906 B1 | * | 2/2001 | Yagii et al. | .................. 324/758 |
| 6,263,383 B1 | | 7/2001 | Lee et al. | |
| 6,312,175 B1 | | 11/2001 | Lum | |
| 6,422,941 B1 | * | 7/2002 | Thorner et al. | ................ 463/30 |
| 6,501,581 B1 | * | 12/2002 | Snyder et al. | .............. 398/129 |
| 6,536,666 B1 | | 3/2003 | Hudrick | |
| 2006/0165110 A1 | * | 7/2006 | Magendanz et al. | ......... 370/419 |
| 2007/0178183 A1 | * | 8/2007 | Halliwell | ..................... 425/464 |

OTHER PUBLICATIONS

The MAC Shop; T3 USB Hub; http://www.themacshope.biz/t3_hub.html; Nov. 30, 2003, 3 pages.
Worth Data UK; USB Adapter for Wedge Barcode Readers; http://www.pcbarcode.com/ukusb.html; Nov. 25, 2003, 3 pages.

(Continued)

Primary Examiner—Thien Minh Le
(74) Attorney, Agent, or Firm—PatentVentures; Bennett Smith; Korbin Van Dyke

(57) ABSTRACT

An improved way to add a wireless peripheral to existing digital systems is taught. A small adapter is suitable for use suspended inline with the cables attached to it. The adapter has an embedded wireless port for receiving data from a wireless peripheral. The adapter further has an input connector for communicating with an existing wired peripheral and an output connector for communicating with the existing system unit. To add a wireless peripheral, the adapter is merely inserted between a wired peripheral and the system unit. The adapter may be plugged directly into the system unit where the cable of the wired peripheral formerly attached. Compared to prior art solutions, the concepts taught ease the installation of the wireless peripherals, lower the cost of the addition, and expand the placement freedom for the wireless peripheral's charging cradle.

50 Claims, 17 Drawing Sheets

OTHER PUBLICATIONS

Altek Instruments, Ltd.; Keyboard Wedge Techniques; http://www.barcodeman.com/altek/mule/wedge.php Nov. 25, 2003 6:43:48AM, 2 pages.

Altek Instruments, Ltd.; The Mule; http://www.barcodeman.com/altek/mule/mule.php Nov. 25, 2003 6:54:31AM, 5 pages.

Altek Instruments, Ltd.; RS232 In-Line Multiplexers; http://www.barcodeman.com/altek/mux/mux.php Nov.25, 2003 6:55:07AM, 3 pages.

Altek Instruments, Ltd.; The Multiplexer Concept; http://www.barcodeman.com/altek/mux/muxwedge.php Nov. 25, 2003 6:56:36AM, 3 pages.

Altek Instruments, Ltd,; AC53 Detailed User Information; http://www.barcodeman.com/altek/mux/muxtech.php Nov. 23, 2003 6:56:58AM, 2 pages.

* cited by examiner

Y-ADAPTER WITH EMBEDDED WIRELESS PORT

CROSS REFERENCE TO RELATED APPLICATIONS

This application claims priority to U.S. Provisional Patent Application Ser. No. 60/526,422 entitled Y-ADAPTER WITH EMBEDDED WIRELESS PORT filed Dec. 2, 2003 and U.S. Provisional Patent Application Ser. No. 60/555,436 entitled Y-ADAPTER WITH EMBEDDED WIRELESS PORT filed Mar. 23, 2004. The aforementioned applications are hereby incorporated in their entirety herein by reference for all purposes.

FIELD OF THE INVENTION

The teachings herein are related to adapters that facilitate the upgrade of electronic systems via the addition of wireless peripherals.

BACKGROUND

FIG. 1A illustrates a prior art Point of Sale (POS) system 1000, including a system unit 110 (such as a PC or merely a terminal) and a CRT 120 (which may be integral to the system unit). Consider that the POS system 1000 was originally installed with only two input peripherals, keyboard 130 and bar-code scanner 140. Scanner 140 is mounted in the top of counter 143 underneath scanning window 142 and communicates with the system unit 110 via link 141 (frequently RS-232 or a variant thereof). Keyboard 130 originally communicated directly with system unit 110 via cable 131 (generally using a serial protocol, to be discussed more below). While not shown, the system unit is typically in at least occasional communication with a remote server via wired or wireless technology, e.g., a RS-232 link, telephone line, or Ethernet. Also not shown, the POS system 1000 will typically include a printer for creating customer receipts.

At some point the POS system 1000 of FIG. 1A was expanded through the addition of handheld bar-code scanner 150, which communicates via cable 151. As shown, handheld scanner 150 may be operatively stored on stand 152. The handheld scanner may be added to the POS system 1000 using a device 160 known as a keyboard-wedge and cable 161. When using a keyboard wedge, decoded bar code data is inserted into existing software applications as though the data were entered from the keyboard. Minimal or no changes to the POS software are necessary and an additional interface port on the system unit is not required. This makes it possible to add a handheld scanner to a POS system well after it is initially installed and configured.

FIG. 1B examines how keyboard-wedge based expansion works from a hardware perspective. As previously mentioned, the keyboard 130 communicates to the system unit 110 via a serial protocol. Accordingly, each of these units has a serial port, illustrated in the diagrams by blocks labeled "S". The serial port is frequently compatible with the RS-232 protocol, or a variation thereof. The serial port is also frequently compatible with the well-known IBM PC-AT keyboard (AT keyboard) serial protocol.

Typical use of mating connectors is symbolically indicated in this and other figures by the use of paired arrowheads. The arrow head direction indicates the typical plug/receptacle orientation and not the direction of signal flow, which is primarily from the peripherals to the system unit, but in general is bidirectional. Where one of the mating connectors is typically chassis mounted, the tail ends of one of the arrow-heads in the pair will be drawn aligned with the boundary of the box corresponding to the chassis.

An early generation handheld scanner, such as that of the illustrated scanner 150A, generally did not include decoder circuitry within the scanner itself. The decoder circuitry is needed to map the signals detected from scanning the bar code into data directly usable by the software implementing the higher-level POS functionality. The decoder circuitry is represented in the diagrams herein by blocks labeled "D".

Keyboard-wedge 160 includes block 1610, which includes both decoder circuitry and a serial port, and block 1600, a switch SW. Thus the barcodes scanned by scanner 150A are decoded and then made suitable for serial transmission via block 1610. Not explicitly shown, block 1610 generally outputs a control signal to the switch 1600. The control signal selects which input of the switch is coupled to the output of the keyboard wedge, and hence to the system unit. In particular, when the decoder output is actively sending bar code data, the control signal selects the output of the decoder. When the decoder output is not sending data, the control signal selects the keyboard output.

The switch 1600 and the cabling associated with it have been represented abstractly to facilitate rapid understanding of the higher level architectures of primary interest herein. In particular, the single signal flow lines of most of the drawings are in fact multi-conductor cabling. Functionally, switch 1600 must exhibit the behavior of an electronically controlled double-pole multi-throw switch, providing a separate switched path for each information signal of the chosen serial protocol.

For the case wherein the serial protocol is that of the AT keyboard, cabling makes use of separate conductors for +5VDC power, ground, CLK, and DATA. While the CLK and DATA lines are at times driven by the system unit, the dominant direction for both is from the keyboard. Data is transmitted in a clocked serial variable-data-rate fashion using a single logic zero start bit, 8 data bits (LSB first), a single odd parity bit, and a single logic one stop bit. The clock rate is generally between 10-20 kHz. Common connectors for use with the AT keyboards are the so-called AT style consisting of a 5-pin DIN connector and the newer so-called PS/2 style consisting on a 6-pin mini-DIN connector.

FIG. 1C illustrates a second generation handheld scanner. Here handheld scanner 150B includes not just the scanner head 1500, but the decoder and serial port circuitry 1610 and switch 1600. Essentially, the keyboard wedge has been moved into the handheld scanner. A characteristic of this approach is the use of an expensive wedge-cable 1620 for connection with handheld scanner 150B. At one end, wedge-cable 1620 has Y-shaped features and is sometimes referred to as a "Y-cable." Wedge-cable 1620 consists for most of its length of what appears outwardly as a single cable. At the scanner-end it may plug into the scanner via a single unified connector. Internally however, wedge-cable 1620 is actually two separate cables: a first cable being the output of switch 1600 and a second cable being the input to the switch 1600 from the output of keyboard 130. These two cables are then broken out separately to form the two arms of the Y and thereby provide connectors for respective cables 161 and 131 to the system unit 110 and the keyboard 130.

FIG. 1D illustrates a third generation handheld scanner in a first mode of operation, compatible with the AT keyboard interface. Here, the bar code scanner being added to the POS system comprises a wireless handheld scanner, represented by block 150C-1; a scanner cradle, represented by block 150C-2; wireless communication path 1700W; and wedge-cable 1620. The scanner includes a scan head 1500, an RF transmit interface 1700X, and battery 1810. The cradle includes an RF receive interface 1700R, decoder and serial port circuitry 1610, switch 1600, and battery charger circuitry 1820.

FIG. 1E illustrates the third generation handheld scanner of FIG. 1D, but in a second mode of operation, compatible with the Universal Serial Bus (USB) interface. Within the cradle 150C-2B, the decoder portion 1340 is shown separately, and a USB interface 1330 is revealed. This system assumes the use of a more contemporary system unit 110, which features an internal USB hub 1320, and a more contemporary keyboard 1300, having an integral USB interface 1310. Since the USB protocol is packet switched, all data from both the scanner and the keyboard are routed via the system unit's internal USB hub 1320. The wedge-cable of FIG. 1D has been replaced by separate USB cables connecting directly to the system unit each of the scanner cradle and the keyboard.

FIG. 1F illustrates a fourth generation handheld scanner. This implementation is motivated and facilitated by the availability and simplicity of low-cost USB-to-wireless adapter 150D-3, which permits the ready addition of a generic wireless interface to the system unit 110 via integral USB hub 1320. Reflecting the evolution of the USB-to-wireless adapter 150D-3, the decoder 1760 is moved into the wireless handheld scanner 150D-1, while the cradle 150D-2 is reduced to comprising just the charger circuitry 1820. Accordingly, the wireless handheld scanner 150D-1 communicates decoded bar code data via wireless link 1740W to USB-to-wireless adapter 150D-3, which passes the data to the USB hub 1320 of system unit 110.

Limitations of the Prior Art

The USB-based handheld scanner solutions described above do nothing for POS systems that have older style RS-232 or AT keyboard based keyboard interfaces. These USB-based solutions also assume that an extra USB port is open for the scanner. This is not always the case, necessitating the additional purchase of an external USB hub.

The above described third-generation handheld scanner, used in AT keyboard compatible mode, makes use of an expensive matched proprietary handheld scanner and cradle and requires an expensive wedge-cable. Because the charging cradle is tethered by the wedge-cable to the system unit, the placement of the charging cradle is restricted to being very close to the system unit.

What is needed is an improved way to add a handheld scanner to existing POS systems that do not have any existing open interface ports suitable for adding new peripherals. What is needed is an improved way to ease installation of a handheld scanner in such systems, lower the cost of the addition, and expand the placement freedom for the charging cradle.

BRIEF DESCRIPTION OF THE DRAWINGS

Various embodiments of the invention are disclosed in the following detailed description and the accompanying drawings.

FIG. 4A is an embodiment that includes an external power connector.

FIG. 4B is an embodiment that is solely self-powered.

DETAILED DESCRIPTION

Figure 1A:
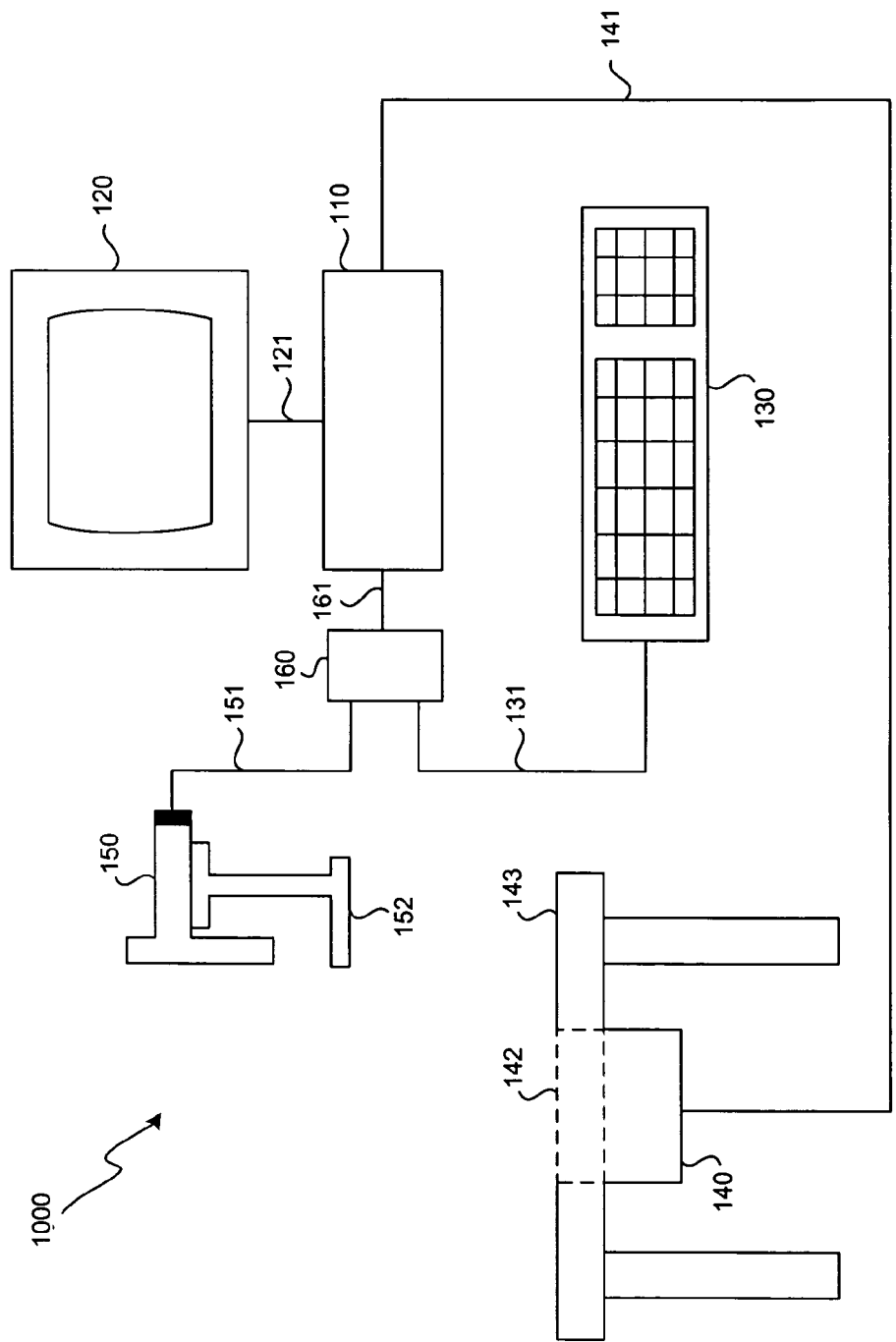
FIG. 1A illustrates a prior art POS system using a keyboard wedge.
Figure 1B:
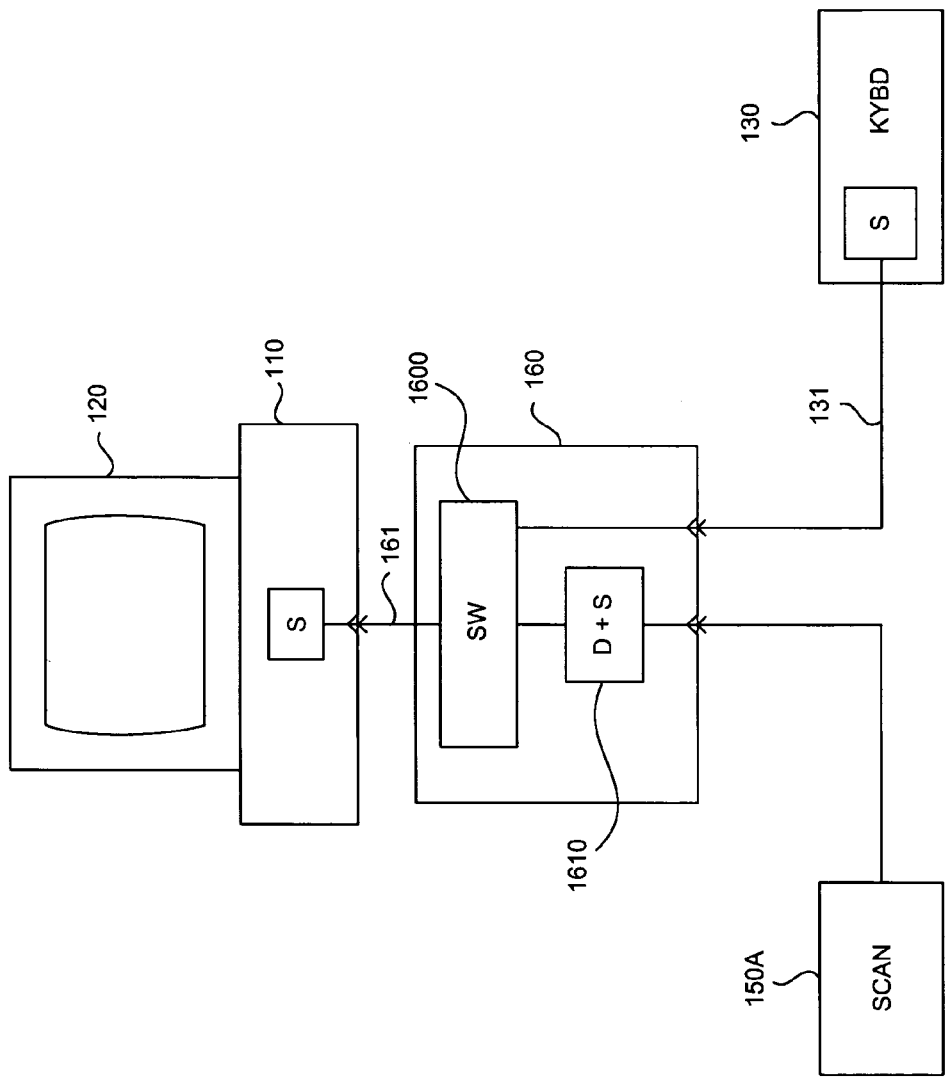
FIG. 1B provides more detail of the keyboard-wedge of FIG. 1A.
Figure 1C:
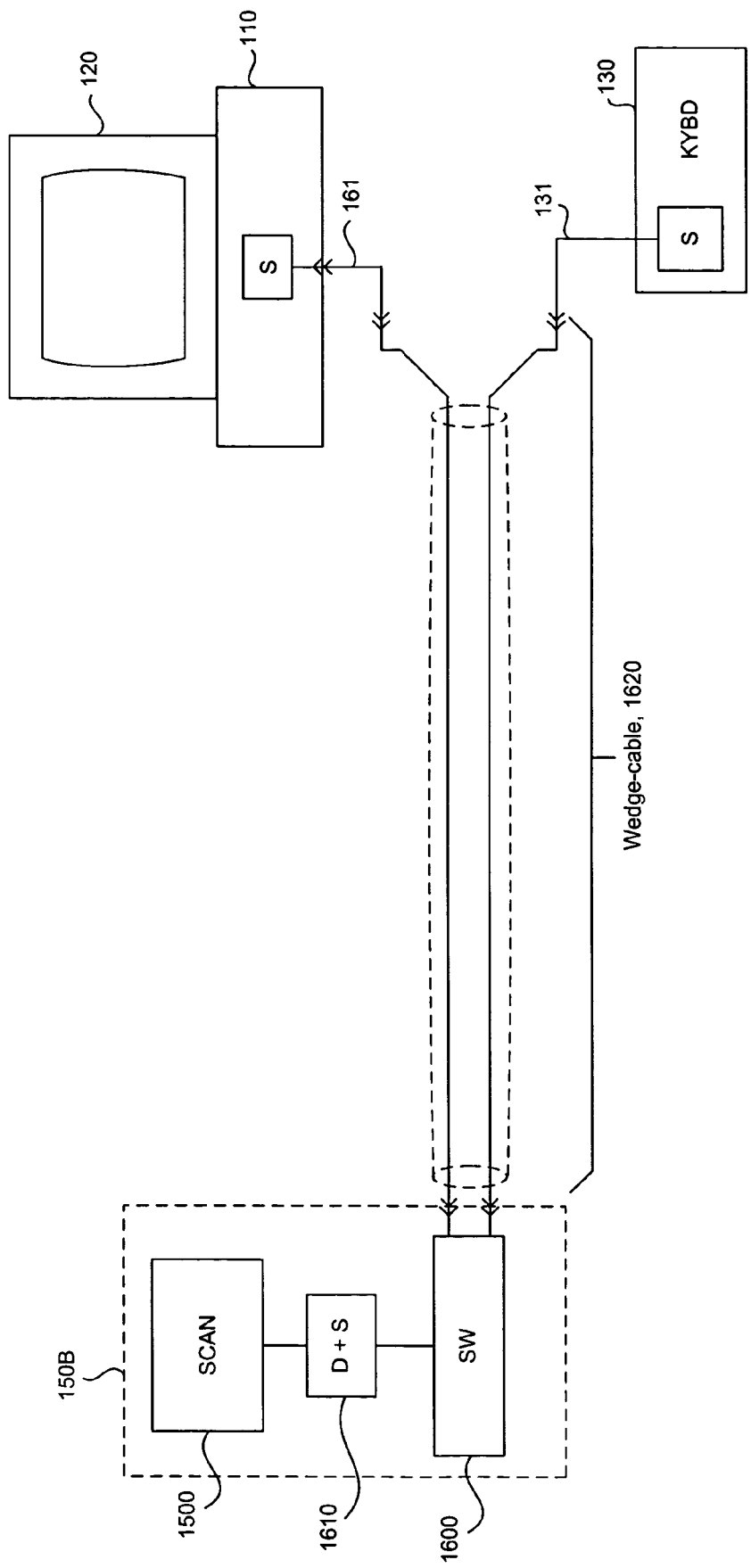
FIG. 1C illustrates adding a second generation handheld scanner to a POS system.
Figure 1D:
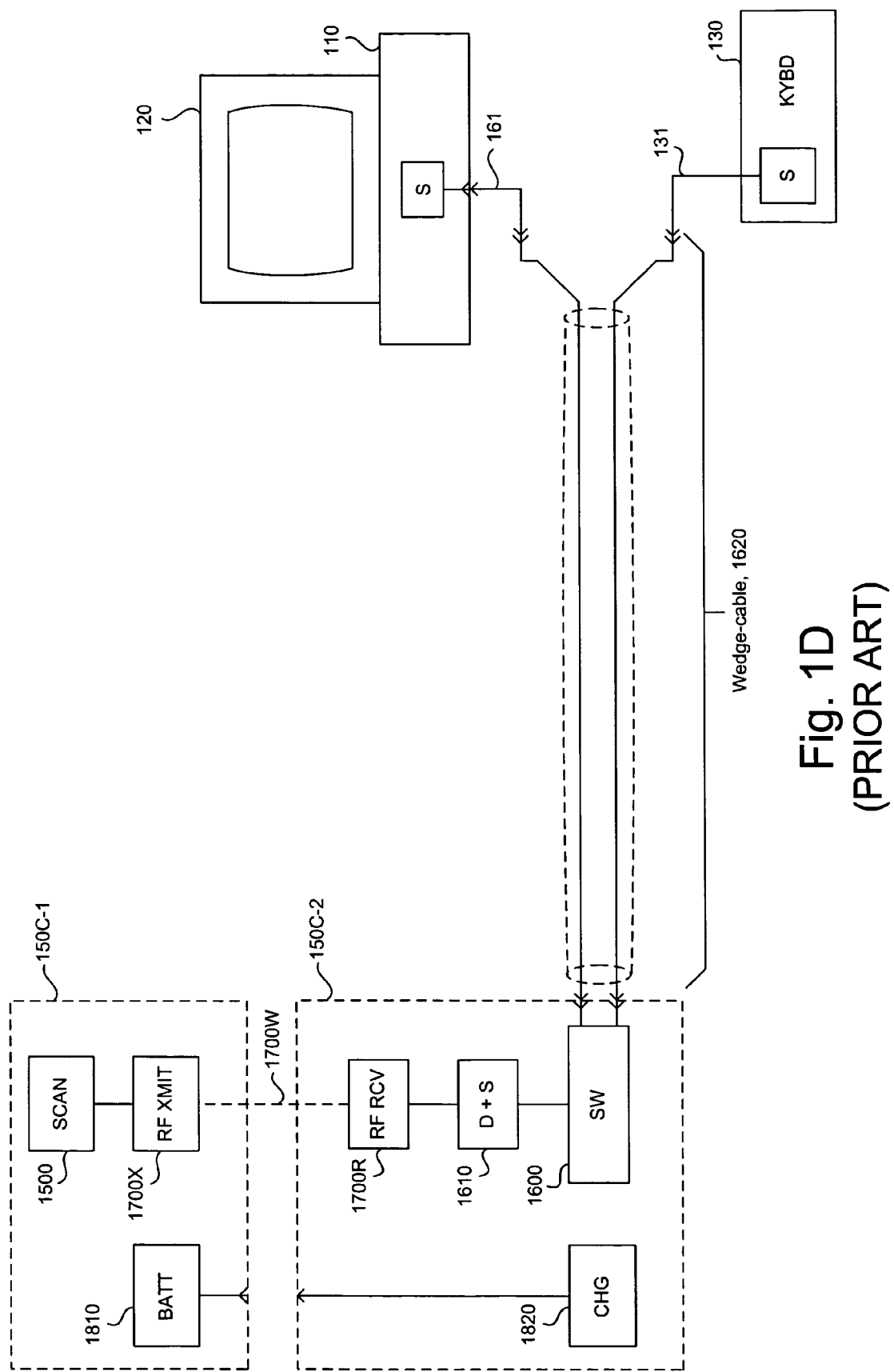
FIG. 1D illustrates adding a third generation handheld scanner to a POS system, when the handheld scanner is configured in a first mode of operation, compatible with the AT keyboard interface.
Figure 1E:
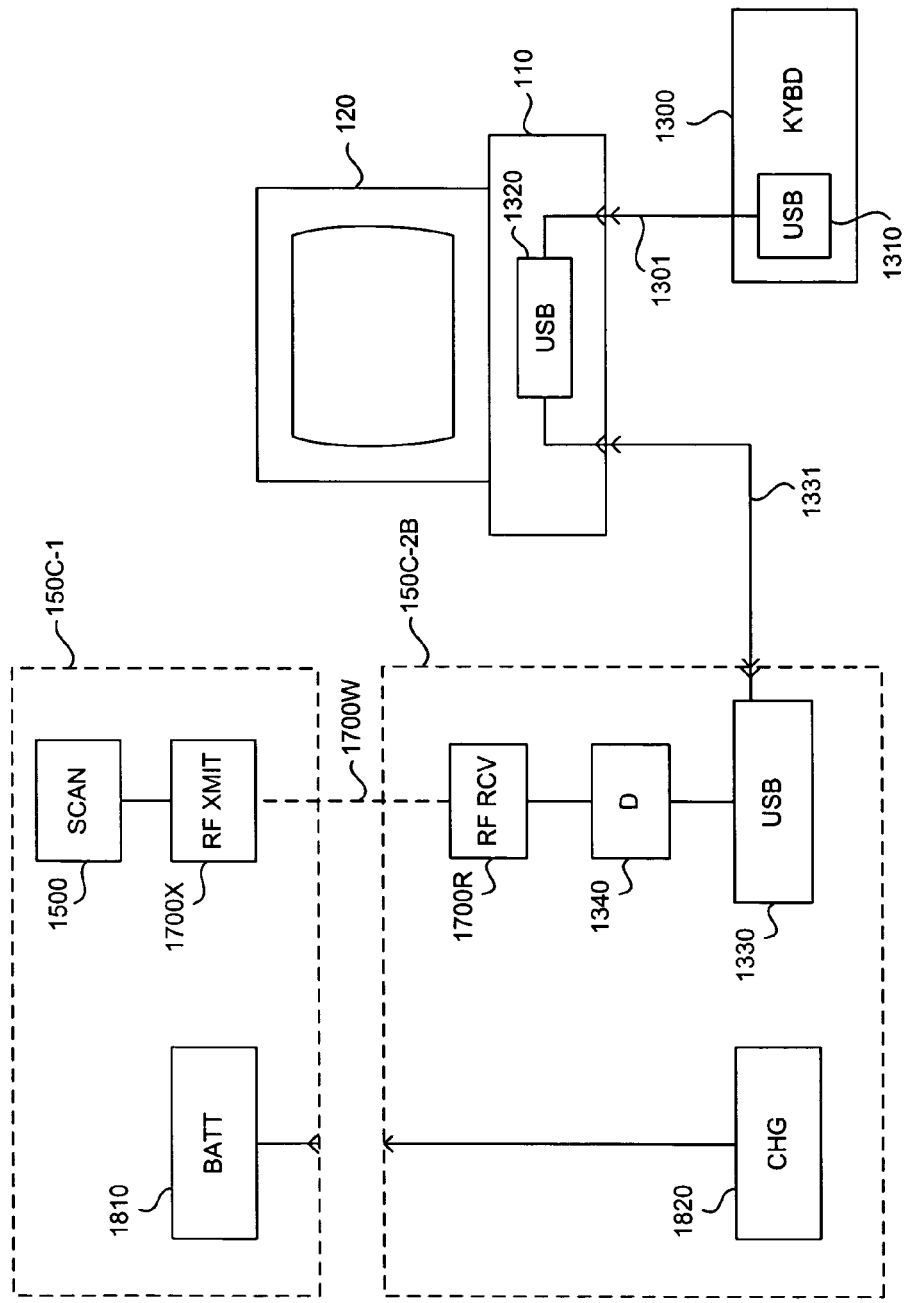
FIG. 1E illustrates adding a third generation handheld scanner to a POS system, when the handheld scanner is configured in a second mode of operation, compatible with the Universal Serial Bus (USB) interface.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description of Embodiments. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification. As is discussed in more detail in the Conclusions, the invention encompasses all possible modifications and variations within the scope of the issued claims, which are appended to the very end of the issued patent.

The embodiments illustrated herein teach an improved way to add a wireless peripheral to existing digital systems. A small lightweight and low-cross-section adapter is illustrated that is suitable for use suspended inline with the cables attached to it. The adapter has an embedded wireless port for receiving decoded data from a wireless peripheral, such as a handheld scanner. The adapter is applicable to all wireless peripheral types. For use with handheld scanners, the adapter is applicable to all scanner types, including those where the scan head (scan engine) is based on optical or radio frequency techniques. Hence the scanner data may correspond to optically-scanned printed-codes (e.g., bar codes) or RF-scanned RFID tags. The adapter further has an input connector for communicating with an existing wired peripheral and an output connector for communicating with the existing system unit. To add a wireless peripheral, the adapter is merely inserted between a wired peripheral and the system unit. The adapter may be plugged directly into the system unit where the cable of the wired peripheral formerly attached.

A first embodiment addresses existing POS systems that use a pre-USB keyboard port such as a RS-232 port or an AT keyboard port. A second embodiment addresses existing POS systems that employ a packet-switched serial interface (such as USB), but do not have any open ports. Compared to prior art solutions, the concepts taught herein ease the installation of the wireless handheld scanner, lower the cost of the addition, and expand the placement freedom for the scanner's charging cradle.

Sample Illustrative Methods and Apparatus

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive, and the invention is not limited to these highlighted combinations. As is discussed in more detail in the Conclusion section, the invention encompasses all possible modifications and variations within the scope of the issued claims, which are appended to the very end of the patent.

A first adapter for use in between a keyboard and a system unit and in conjunction with a wireless peripheral, the first adapter comprising: a first connector for communicating with the keyboard, a second connector for communicating with the system unit, a wireless interface for communicating with the wireless peripheral, a serial interface coupled to the wireless interface, a switch having inputs coupled to the first connector and to the serial interface and having an output coupled to the second connector, wherein the switch couples the serial interface to the second connector when there is data activity from the wireless peripheral and couples the first connector to the second connector when there is no data activity from the wireless peripheral, and wherein the aforementioned adapter components are implemented within a common housing. The foregoing adapter wherein the weight and shape of the adapter are suitable for direct suspended insertion into a receptacle on the system unit compatible with the second connector. The foregoing adapter wherein the housing is implemented using injection molded plastic and the components are embedded therein. The first adapter, wherein the adapter is self-powered from the power supplied by the system unit via the second connector. The first adapter, further including a third connector for coupling to an external power supply. The first adapter wherein the serial interface is compatible with an AT keyboard interface. The foregoing adapter, wherein the first connector is a female AT keyboard connector and the second connector is a male AT keyboard connector. The first adapter further including a third connector for communicating with an external wired peripheral and at least one protocol adapter for adapting the wired peripheral to be compatible with an AT keyboard interface. The foregoing adapter wherein the external wired peripheral has an RS-232 interface.

A second adapter for use in between a keyboard and a system unit and in conjunction with a wireless peripheral, the second adapter comprising: a first connector for communicating with the keyboard, a second connector for communicating with the system unit, a wireless interface for communicating with the wireless peripheral, a packet-switched serial interface coupled to the wireless interface, a packet-switched serial hub having inputs coupled to the first connector and to the packet-switched serial interface and having an output coupled to the second connector, and wherein the aforementioned adapter components are implemented within a common housing. The foregoing adapter wherein the weight and shape of the adapter are suitable for direct suspended insertion into a receptacle on the system unit compatible with the second connector. The foregoing adapter wherein the housing is implemented using injection molded plastic and the components are embedded therein. The second adapter, wherein the adapter is self-powered from the power supplied by the system unit via the second connector. The second adapter, further including a third connector for coupling to an external power supply. The second adapter wherein the packet-switched serial interface is compatible with the USB standard. The foregoing adapter wherein the connectors are USB connectors. The second adapter further including a third connector for communicating with an external wired peripheral and at least one legacy adapter for adapting the wired peripheral to be compatible with the USB standard. The foregoing adapter wherein the external wired peripheral has an AT keyboard compatible interface.

A third adapter for use in between a wired peripheral and a computing host and in conjunction with a wireless peripheral, the first adapter comprising: a first connector for communicating with the wired peripheral, a second connector for communicating with the computing host, a wireless interface for communicating with the wireless peripheral, a switch having inputs coupled to the first connector and to the wireless interface and having an output coupled to the second connector, wherein the switch couples one of the first connector and the wireless interface to the second connector in accordance with a predetermined criteria, and wherein the aforementioned adapter components are implemented within a common housing. The foregoing adapter wherein the weight and shape of the adapter are suitable for direct suspended insertion into a receptacle on the computing host compatible with the second connector. The foregoing adapter wherein the housing is implemented using injection molded plastic and the components are embedded therein. The third adapter, wherein the adapter is self-powered from the power supplied by the computing host via the second connector. The third adapter, further including a third connector for coupling to an external power supply. The third adapter wherein the wired peripheral has an RS-232 interface. The third adapter wherein the computing host has an RS-232 interface. The third adapter wherein the wired peripheral is a wired scanner. The third adapter wherein the wireless peripheral is a data collection device. The third adapter wherein the wireless peripheral is a wireless RFID reader. The third adapter wherein the wired peripheral is a wired scanner and the wireless peripheral is a wireless RFID reader. The third adapter, wherein the predetermined criteria is the existence of data activity from the wireless peripheral. The foregoing adapter, wherein the switch couples the wireless interface to the second connector when there is data activity from the wireless peripheral and couples the first connector to the second connector when there is no data activity from the wireless peripheral. The third adapter, wherein the coupling between the wireless interface and the switch includes protocol conversion circuitry for adapting the wireless interface to the protocol of the computing host.

A fourth adapter, including all of the aspects of any one of the first, second, or third adapters, wherein the wireless peripheral includes a scan head (scan engine) that uses optics based scanning. The fourth adapter, wherein the scan head is for scanning bar codes. The fourth adapter, wherein the scan head includes a laser scanner. The fourth adapter, wherein the scan head includes a 1D CCD array. The fourth adapter, wherein the scan head includes a 2D CCD imager.

A fifth adapter, including all of the aspects of any one of the first, second, or third adapters, wherein the wireless peripheral includes a scan head (scan engine) that uses RF based scanning. The fifth adapter, wherein the scan head is for scanning RFID tags. The fifth adapter, wherein the scan head uses inductive coupling techniques. The fifth adapter, wherein the scan head uses perturbated reflected RF energy techniques. The fifth adapter, wherein the scan head uses microwave backscatter techniques.

DETAILED DESCRIPTION OF EMBODIMENTS

Figure 1F:
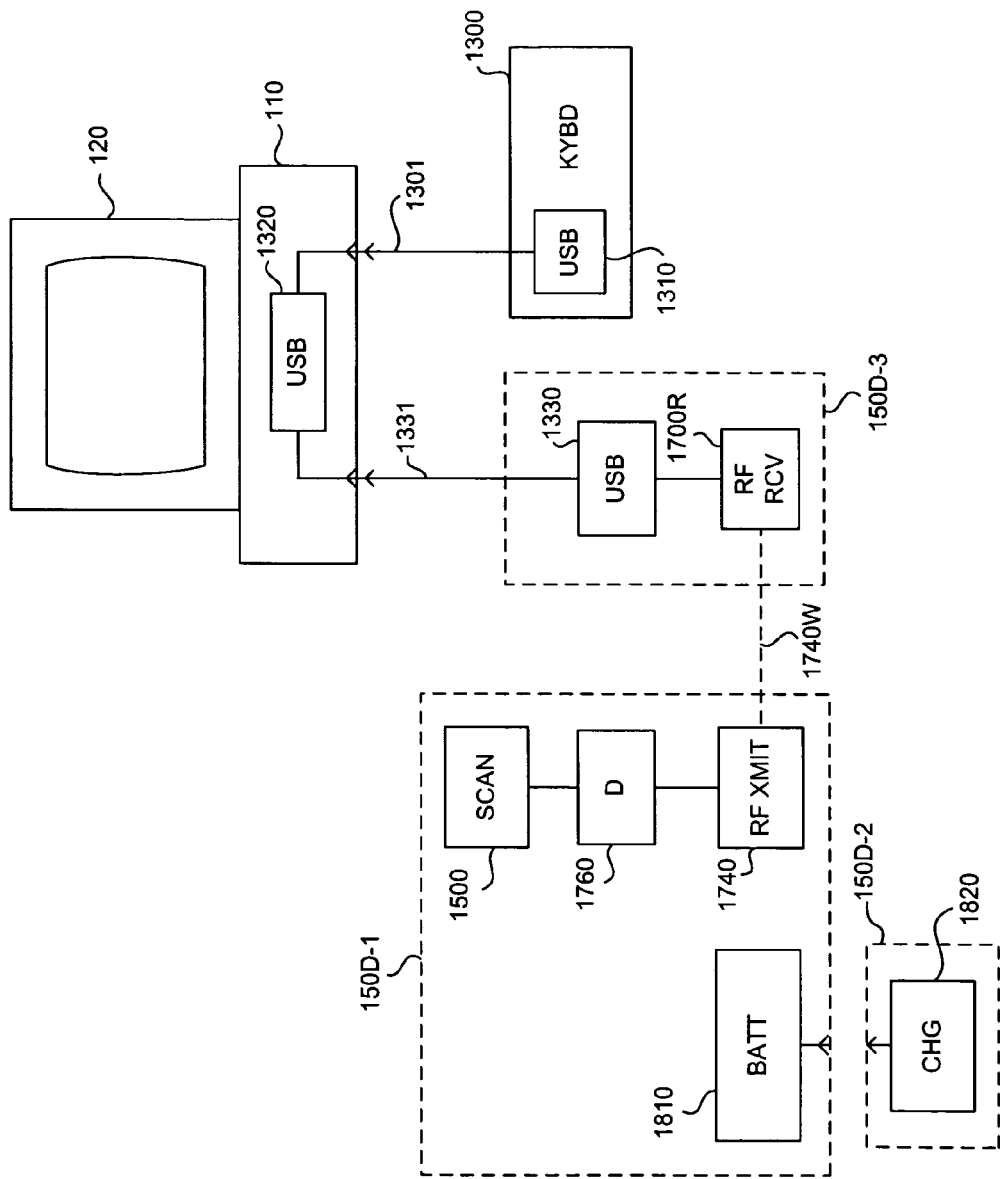
FIG. 1F illustrates adding a fourth generation handheld scanner to a POS system.
Figure 2:
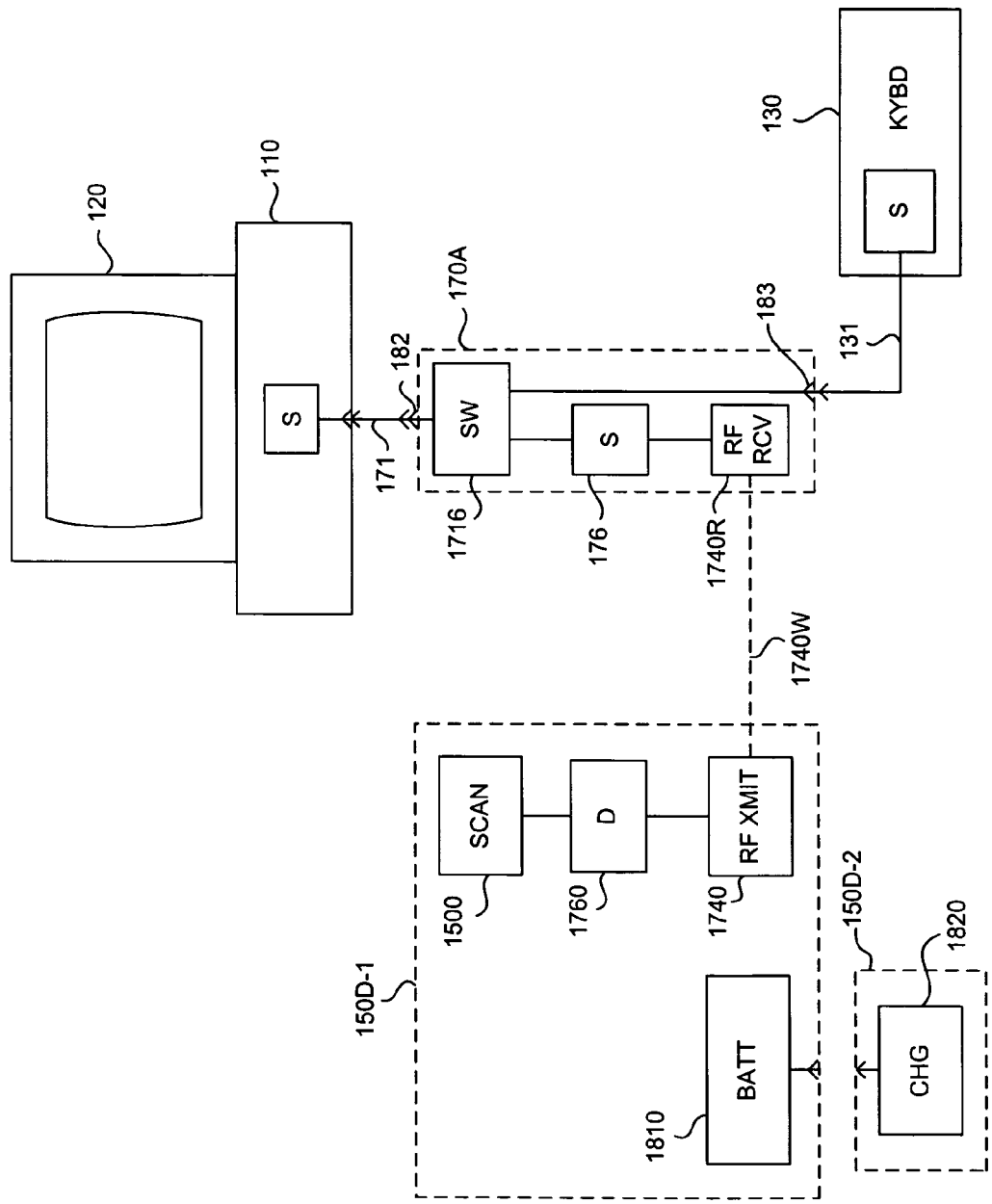
FIG. 2 illustrates a Y-adapter with an embedded wireless port for adding a handheld scanner to an existing system, in accordance with a first embodiment.

In accordance with a first embodiment of the concepts taught herein, FIG. 2 illustrates a method and device for adding a wireless peripheral (such as a handheld scanner) to an existing system (such as a POS system). Serial interfaces compatible with the serial interface of the computing host (system unit 110) are shown by blocks labeled with "S". Wireless handheld scanner 150D-1 and associated charging cradle 150D-2 are as previously described in the prior art system of FIG. 1F. As discussed in more detail below, the serial interfaces may be compatible with any of a variety of standards, including the AT keyboard interface and the RS-232 interface. Furthermore, as will also be discussed, a packet-switched I/O interface may be substituted, such as an interface compatible with the USB interface.

Y-adapter 170A includes a connector 183, an RF receive interface 1740R, serial interface 176, switch 1716, and connector 182. Y-adapter 170A is coupled to the serial interface of wired peripheral 130 via connector 183 and cable 131. In certain illustrative embodiments wired peripheral 130 is a keyboard. As illustrated later, the Y-adapter concepts taught herein are equally applicable to other wired peripherals. Y-adapter 170A is coupled to the serial interface of system unit 110 via connector 182. Extension cable 171 may be optionally used. Y-adapter 170A communicates with wireless handheld scanner 150D-1 via wireless link 1740W. In an illustrative embodiment the wireless technology is compatible with the Bluetooth standard, which has particular low-power attributes. Those skilled in the art will appreciate that the particular requirements of a given application may call for other embodiments to implement the wireless technology using WiFi or some other wireless protocol.

Figure 3A:
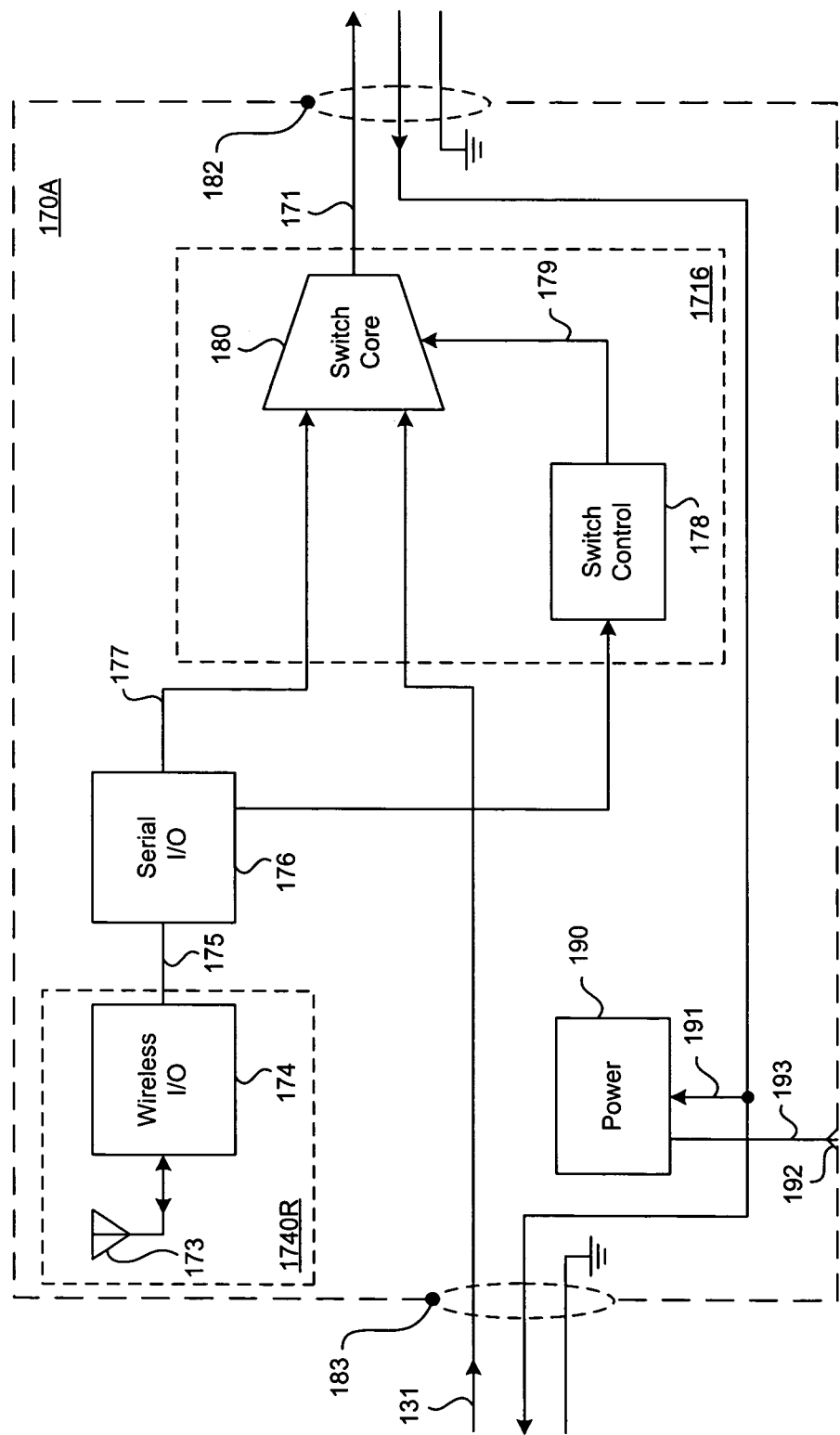
FIG. 3A provides additional detail of the Y-adapter of FIG. 2.

FIG. 3A provides additional detail of the Y-adapter 170A of FIG. 2. RF interface 1740R comprises antenna 173 and wireless I/O module 174. Switch 1716 comprises Switch Core 180 and Switch Control 178, coupled via Switch Select 179. Switch Control 178 acts to couple the output of the Serial I/O to the Y-adapter output when there is data activity from the wireless peripheral, and to couple the keyboard input to the Y-adapter output otherwise. Switch Control 178 is shown with a control input from Serial I/O 176. Those skilled in the art will appreciate that the control input could also be devised directly from wireless I/O module 174, as long as data activity from the wireless peripheral causes the switch to route the wireless peripheral data to the system unit.

Figure 3B:
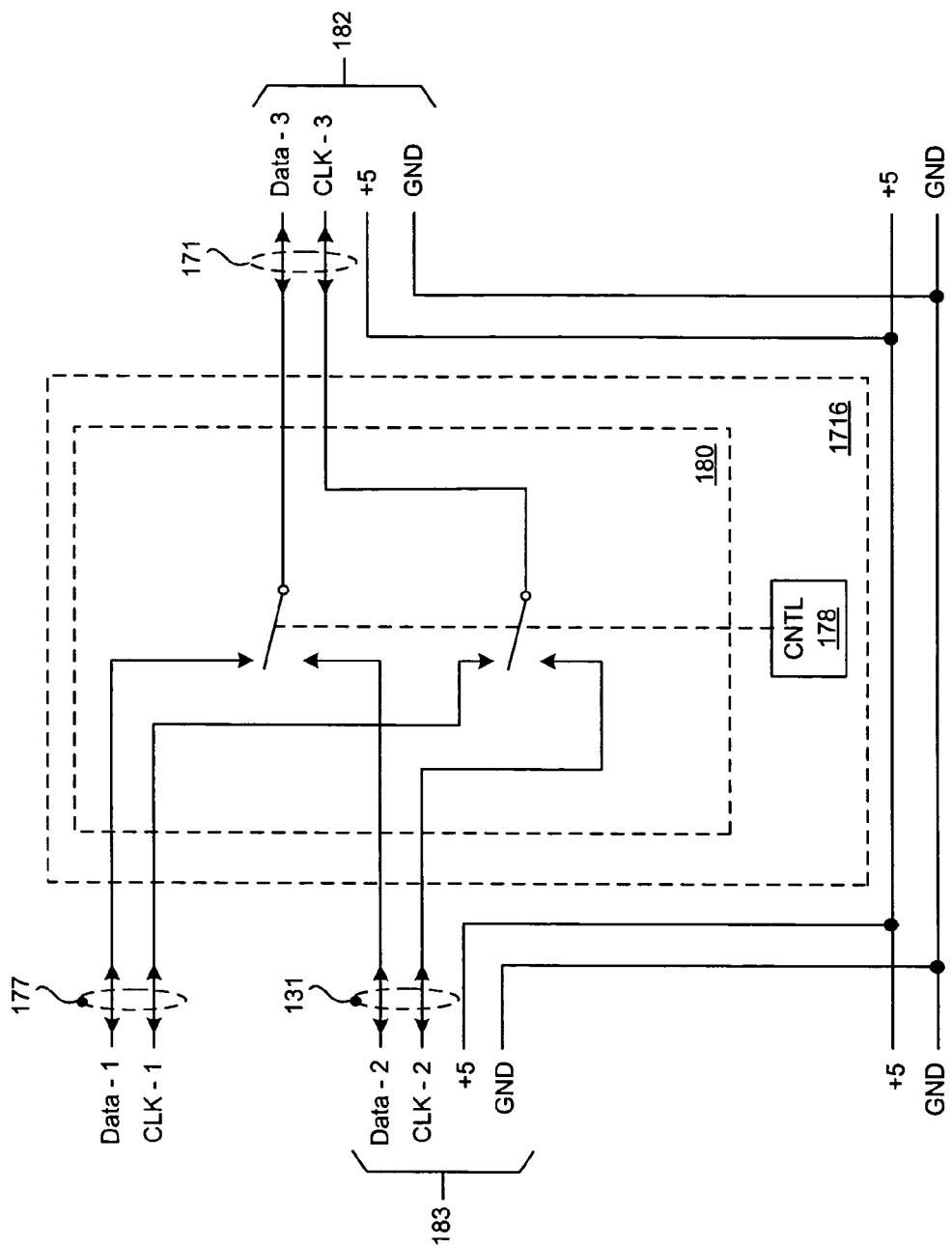
FIG. 3B conceptually illustrates the Switch Core of FIG. 3A with greater detail.

For use with the AT keyboard interface, each signal flow illustrated going through the switch actually represents two signals (CLOCK and DATA). FIG. 3B illustrates that Switch Core 180 conceptually implements a double-pole double-throw functionality. The double-pole double-throw switch functionality may be implemented using any of a variety of techniques known in the art, including: a relay, a multiplexer implemented using pass-gates or logic-gates, a crossbar, or three-state busing. Switch Select 179 may be implemented as 2 unencoded select lines, or a 1-bit encoded select line. In the implementation shown, the power and ground signals have been routed separately unswitched.

The AT keyboard interface on the system unit may source 250-300 mA over the +5V signal line. Taking into account the available supply current, the maximum keyboard current (some POS keyboards consume significantly more power than others), and the available technology for the internal circuitry of the Y-adapter 170A, under some combinations of the foregoing the available power budget will permit the Y-adapter to be self-powered. Accordingly, in a self-powered configuration, Power block 190 takes power from the +5V signal line via path 191 and distributes it to the other electronics within Y-adapter 170A. Optionally, connector 192 may be embedded within the adapter to receive power via path 193 from an external supply (such as a "wall-blob" with supply cable and plug). Connector 192 may also have an integral switch to disconnect path 191 when an external supply plug is inserted in connector 192.

Figure 4A:
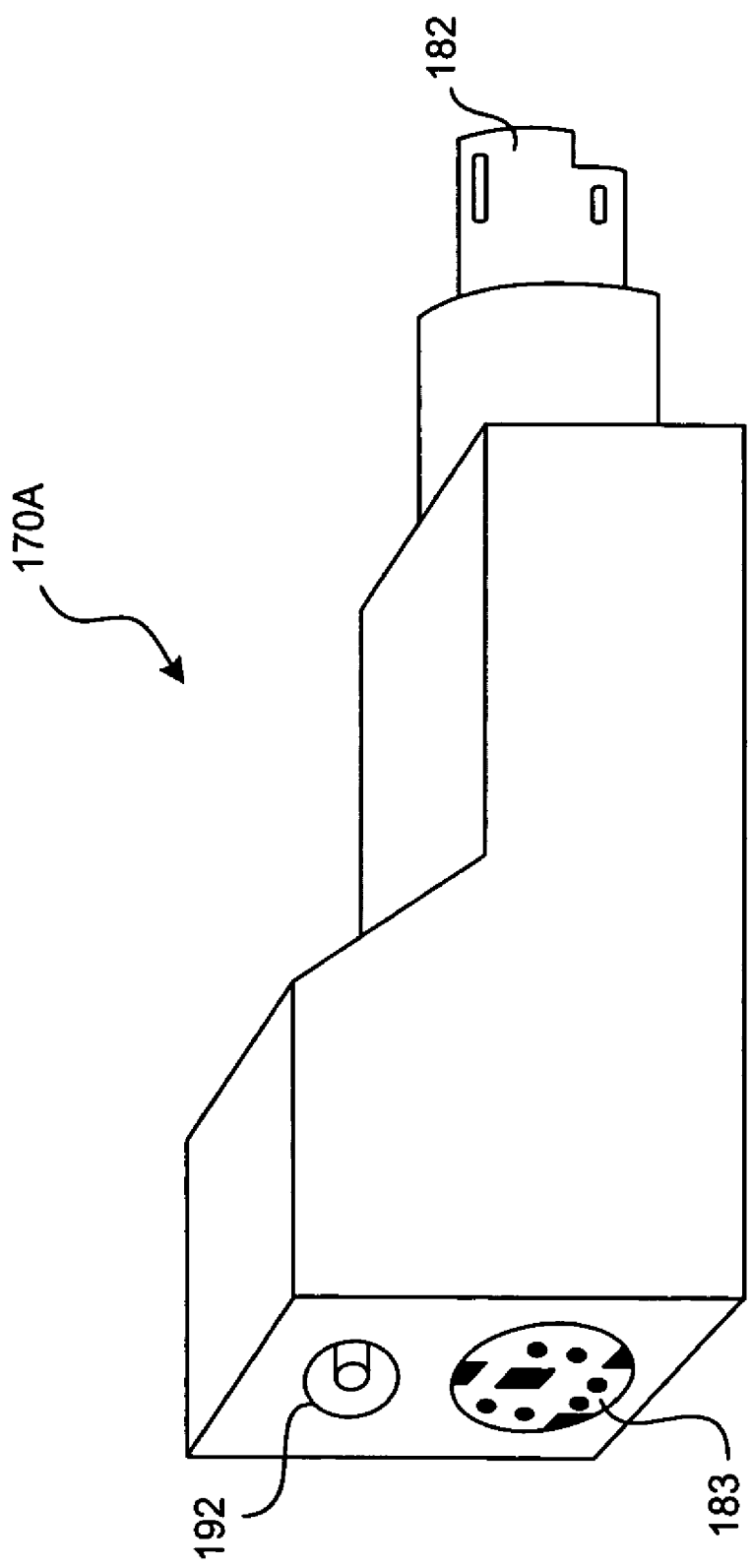
FIGS. 4A and 4B show the Y-adapter of FIGS. 2 and 3 implemented as a single injection molded piece.
Figure 4B:
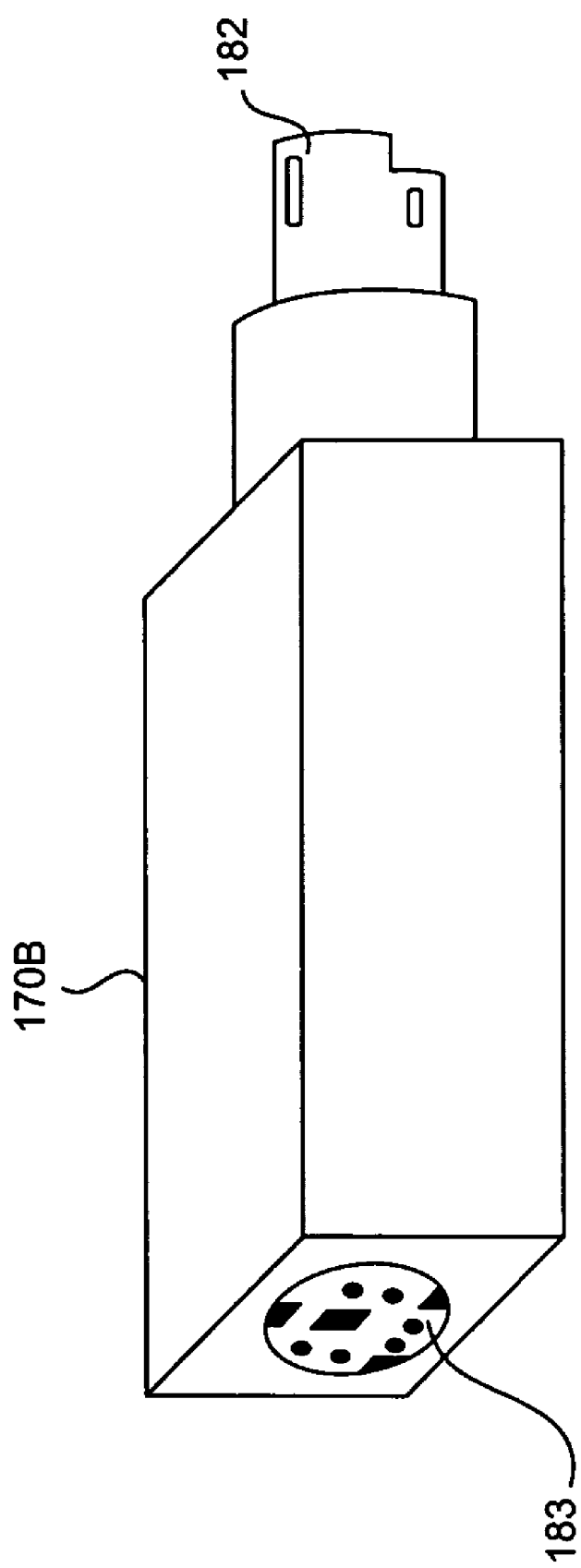

In the illustrative embodiments of FIGS. 4A and 4B, the Y-adapter of FIGS. 2 and 3 is implemented as a single injection molded piece. FIG. 4A is an embodiment that includes external power connector 192. FIG. 4B is an embodiment that is solely self-powered (power is derived from the system unit via connection thereto). In each of FIGS. 4A and 4B, the profile (cross-section) of the adapter is kept as small as possible, particularly at the output end, such that the adapter may be plugged directly into the system unit without mechanically conflicting with adjacent cabling.

Figure 5:
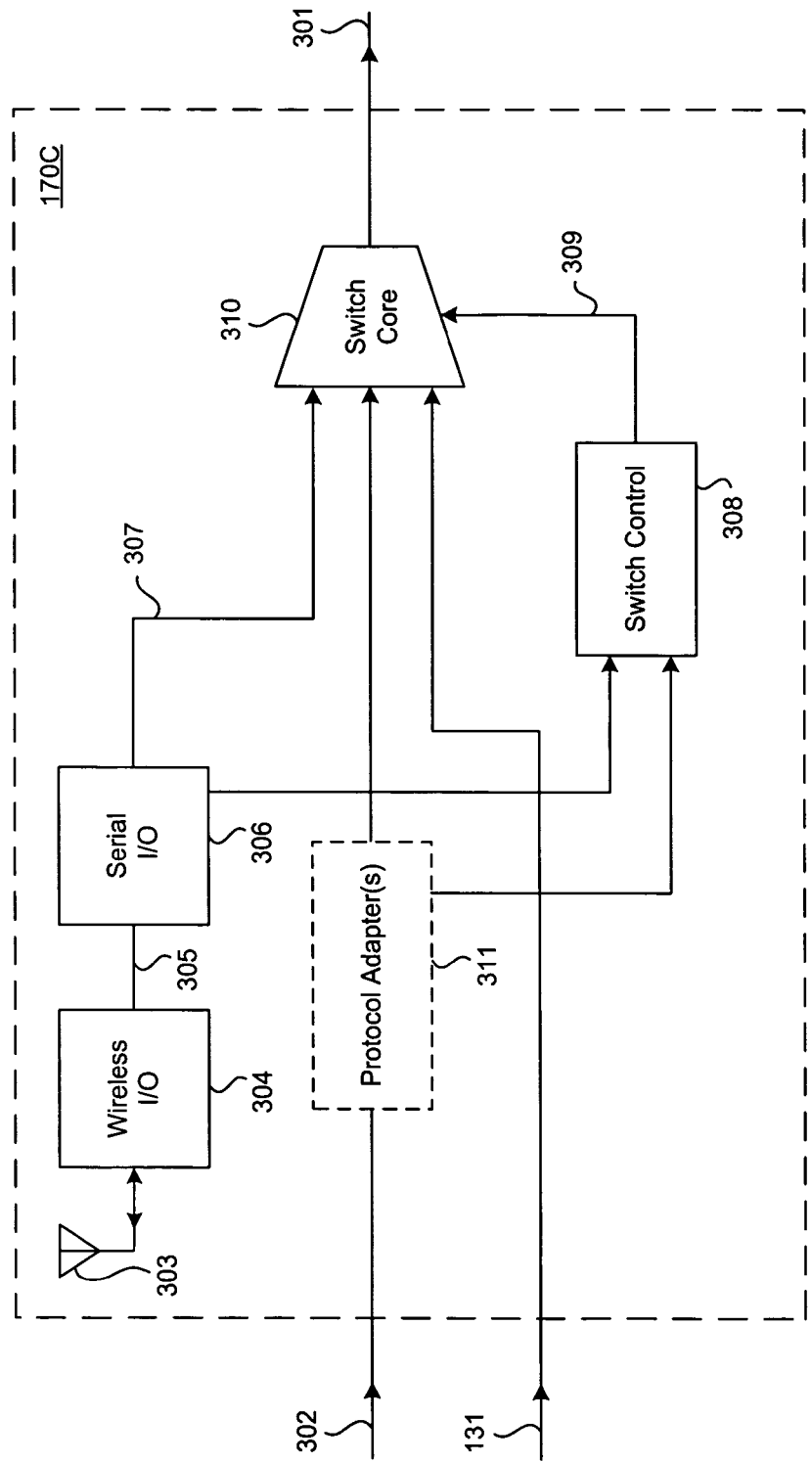
FIG. 5 illustrates that an extension of the embodiment of FIG. 3, wherein an additional input is accommodated.

FIG. 5 illustrates an extension of the embodiment of FIG. 3, wherein an additional input is accommodated. If the input is not AT keyboard compatible, such as for an RS-232 device, then optional Protocol Adapter(s) 311 will be required to adapt the input to be AT keyboard compatible. In general, the adaptation involves both electrical signal level and sequential state behavior conversion. Switch Control 308 is shown with two control inputs, so that the switch input with activity can be automatically coupled to the output. Switch Control output 309 would necessarily need to be an expanded form of Switch Select 179 with either 3 unencoded selects, or a 2-bit encoded select. Those skilled in the art will appreciate how the Y-adapter could be further scaled up to accommodate additional inputs.

Those skilled in the art will also appreciate that the choice of the AT keyboard interface for the illustrative embodiments described so far is not limiting on the concepts taught herein. Any desired interface protocol could be targeted as the output interface protocol. In particular, it would be possible to target the RS-232 standard for the non-wireless input and for the output of the Y-adapter. In such a scenario, Serial I/O 176 in FIG. 3 (and Serial I/O 306 in FIG. 5) would be implemented as RS-232 interfaces. If an additional input were accommodated, the optional Protocol Adapter(s) 311 of FIG. 5 would be required to adapt any non-RS-232 input to be RS-232 compatible. In general, the adaptation involves both electrical signal level and sequential state behavior conversion.

Figure 6:
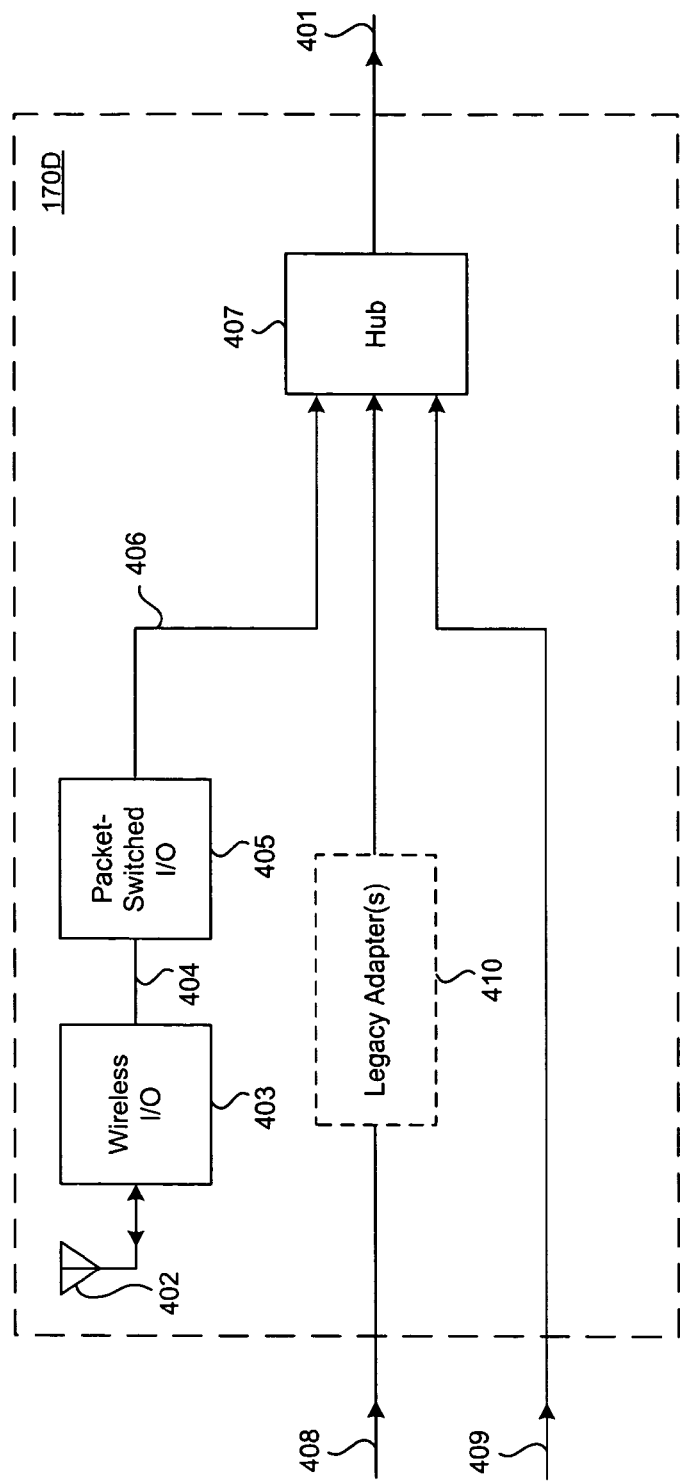
FIG. 6 illustrates a Y-adapter for adding a handheld scanner to an existing system that uses USB, but does not have any open USB ports, in accordance with a second embodiment.

In accordance with a second embodiment of the concepts taught herein, FIG. 6 illustrates a method and device (Y-adapter 170D) for adding a handheld scanner to an existing POS system that uses a packet-switched serial protocol, but does not have an open port. Output port 401 needs to be compatible with the packet-switched serial protocol of the POS system. Accordingly, the embedded switch of the earlier embodiments is replaced with embedded packet-switched hub 407. Likewise, the serial interface following the Wireless I/O block 403 (with associated antenna 402) is Packet-switched I/O interface 405. Input 409 is assumed to be compatible to the same packet-switched serial protocol. To illustrate the general case, Y-adapter 170D is shown with an additional input 408. Should this input be a non-packet-switched legacy device (such as a device that is RS-232 or AT keyboard compatible), optional Legacy Adapter(s) 410 will be required to couple a compatible signal to the embedded hub 407. USB is the packet-switched protocol typically used. However, this is not limiting, and other packet-switched serial protocols may be used instead (such as protocols compatible with the Firewire standard).

Figure 7A:
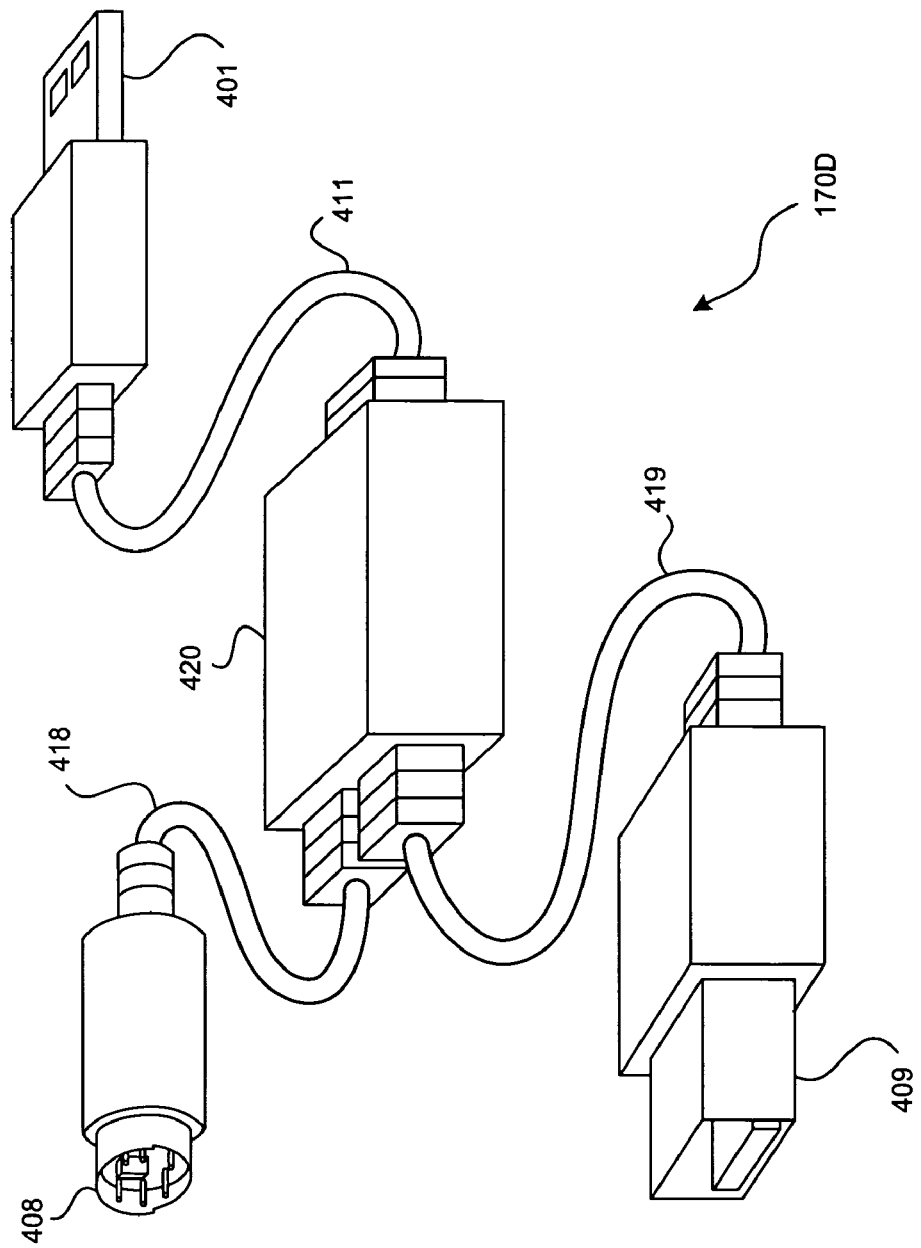
FIG. 7A illustrates the Y-adapter of FIG. 6, including both a USB and an AT keyboard input, implemented using separate injection molded pieces for the circuitry and for each of the connectors.
Figure 7B:
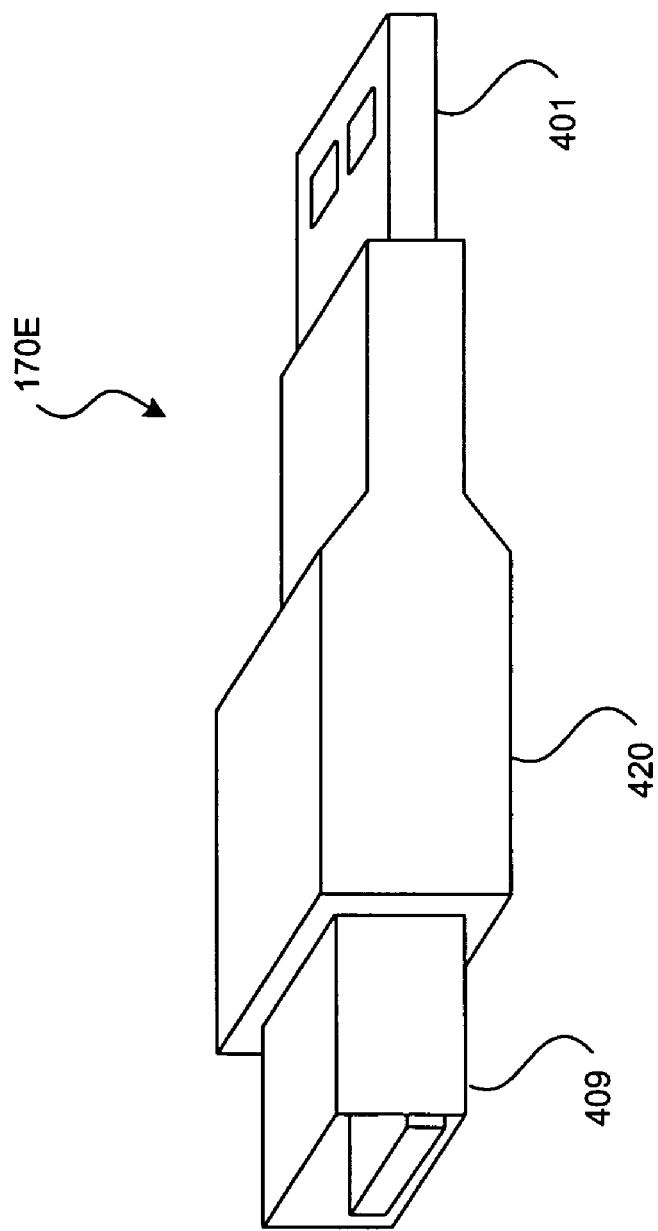
FIG. 7B illustrates the Y-adapter of FIG. 6, with only one wired input, implemented as a single injection molded piece.

FIGS. 7A and 7B illustrate embodiments wherein the POS system to be expanded uses a USB keyboard. The Y-adapter of FIG. 6, including both a USB and an AT keyboard input, is implemented in FIG. 7A as separate injection molded pieces for the circuitry 420 and each of connectors 401, 409, and 408. The Y-adapter of FIG. 6, but with only one wired input, is implemented in FIG. 7B as a single injection molded piece. The profile (cross-section) of the adapter is kept as small as possible, particularly at the output end, such that the adapter may be plugged directly into the system unit without mechanically conflicting with adjacent cabling. The Y-adapters of FIGS. 7A and 7B are shown as being self-powered. As the USB port on a system unit may source up to 500 mA, there is a reduced need for an external power supply compared to the AT keyboard output embodiments. Nonetheless, those skilled in the art will appreciate that a connector for an external power supply could be added in the same manner as was illustrated in the embodiments of FIGS. 3 and 4B.

Figure 8:
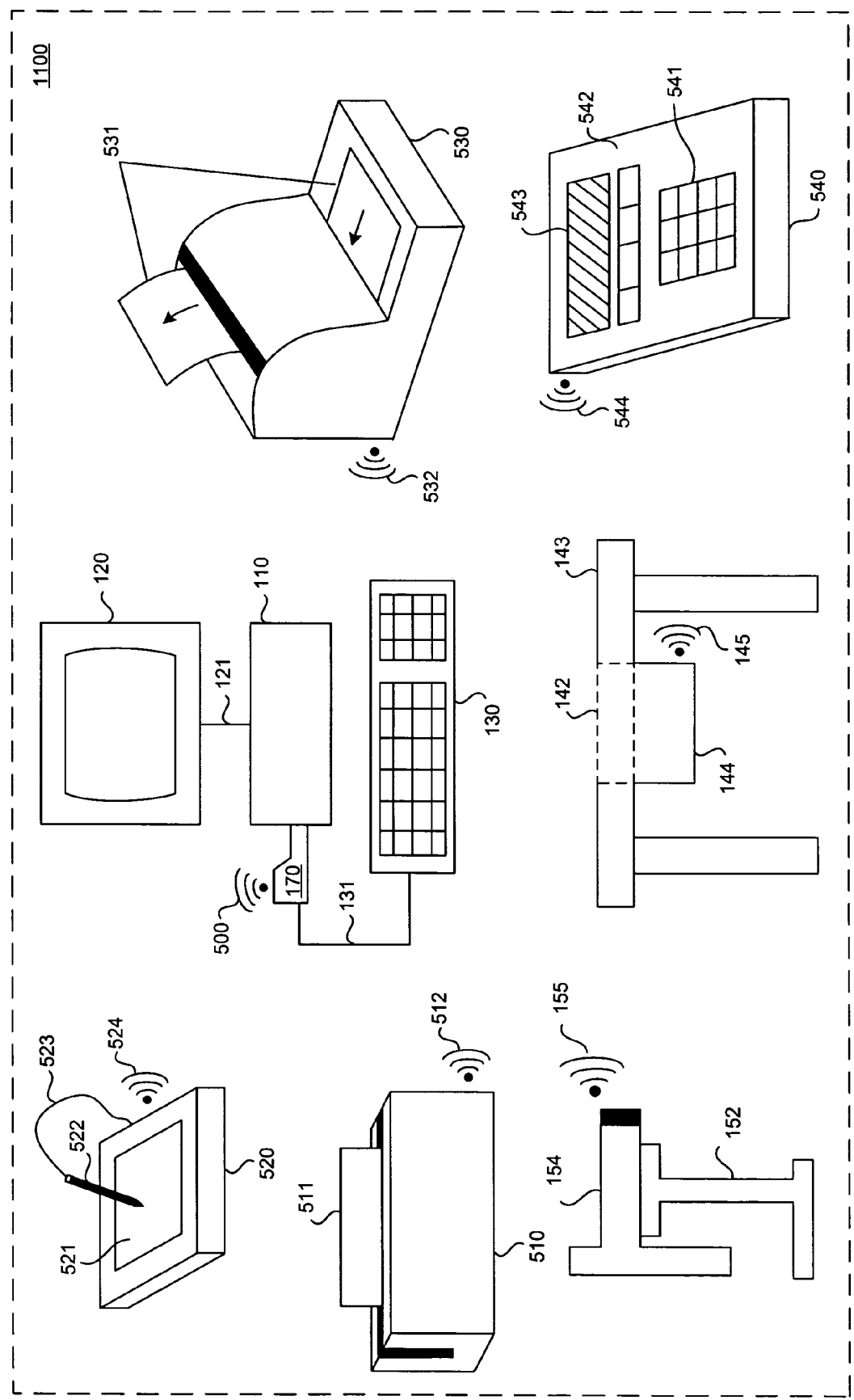
FIG. 8 illustrates a system 1100, in accordance with the concepts taught herein, with various peripherals that may be easily added to the system through use of any of the adapters of FIGS. 2-7.

FIG. 8 illustrates a system 1100 (such as a POS system), in accordance with the concepts taught herein, in which one or more of the various peripherals illustrated may be easily added to the system through use of any of the adapters of FIGS. 2-7. A Y-adapter 170, in accordance with any of the foregoing embodiments, is juxtaposed between the keyboard 130 and the system unit 110, and communicates with the peripherals via wireless transmissions 500. Y-adapter 170 is shown projecting from the system unit connector into which it has been directly inserted. An optional extension cable could also be used between the system unit and the Y-adapter 170. As shown, the peripherals include, but are not limited to, signature pad 520, credit-card reader 510 (a Magnetic Stripe Card Reader, or MSR), handheld scanner 154, check reader 530 (a Magnetic Ink Character Recognition, or MICR reader), in-counter scanner 144, and PIN-pad 540.

Signature pad 520 communicates with Y-adapter 170 via wireless transmissions 524, and includes writing area 521, pen 522, and cable 523. Credit-card reader 510 communicates data read from credit-card 511 to Y-adapter 170 via wireless transmissions 512. Handheld scanner 154, stored in holder/stand 152, communicates with Y-adapter 170 via wireless transmissions 155. Check reader 530 communicates data read from check 531 to Y-adapter 170 via wireless transmissions 532. In-counter scanner 144 communicates with Y-adapter 170 via wireless transmissions 145. Scanner 144 is mounted in counter 143 underneath scanning window 142. PIN-pad 540 communicates with Y-adapter 170 via wireless transmissions 544. PIN-pad 540 includes numeric keypad 541, special function keys 542, and display 543.

Figure 9:
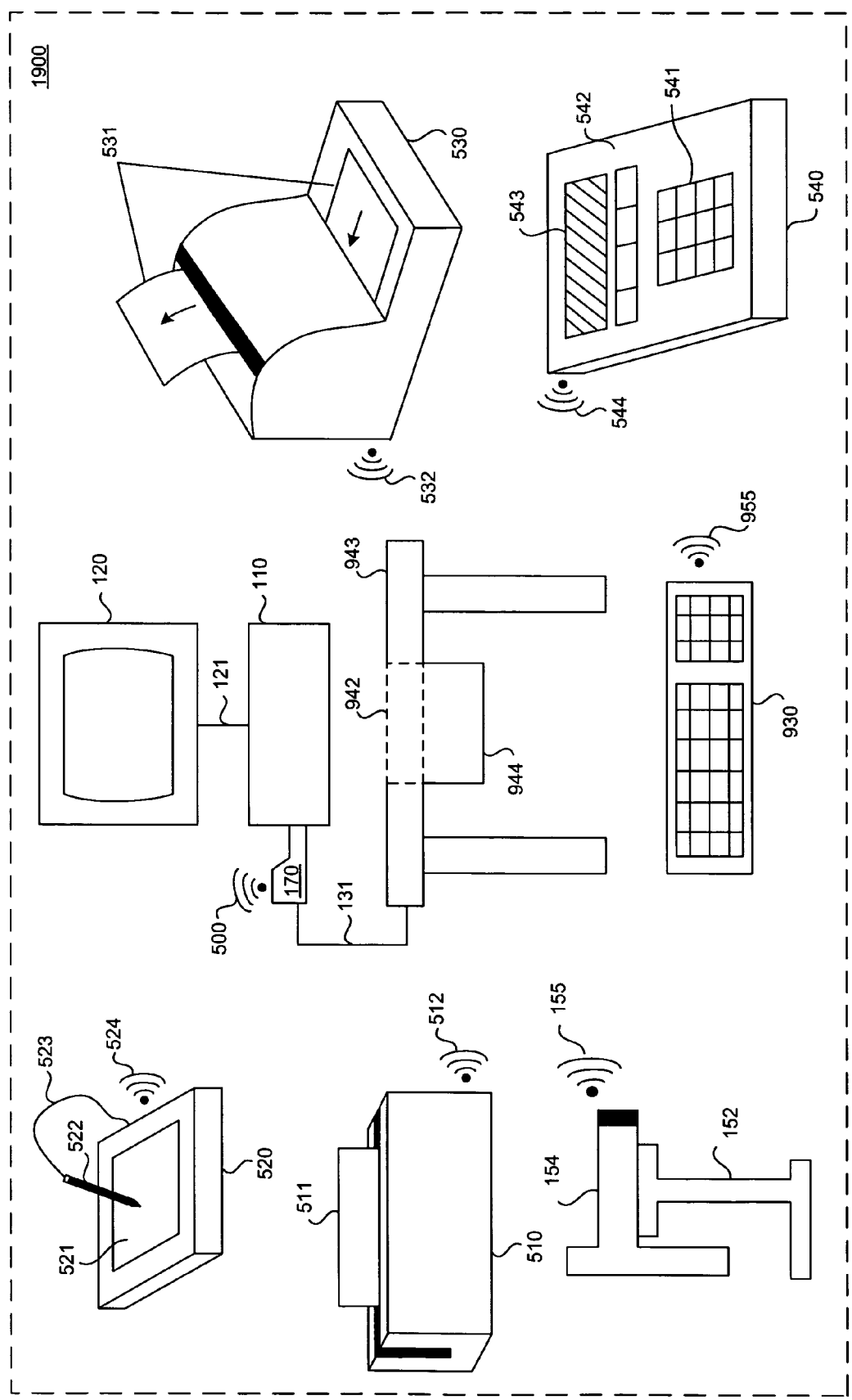
FIG. 9 illustrates a system 1900, in accordance with the concepts taught herein, with various peripherals that may be easily added to the system through use of any of the adapters of FIGS. 2-7.

FIG. 9 illustrates a system 1900, in accordance with the concepts taught herein, in which one or more of the various peripherals illustrated may be easily added to the system through use of any of the adapters of FIGS. 2-7. This system, by contrast with the system of FIG. 8, serves to emphasize that there the Y-adapters taught herein are equally applicable to any of a variety of wired peripherals, not just wired keyboards. In FIG. 9 an exemplary wired peripheral, scanner 944, is mounted in counter 943 underneath scanning window 942. In this illustrative embodiment, counter scanner 944 has an RS-232 interface, compatible with an RS-232 interface of the system unit 110. Y-adapter 170 provides expansion flexibility for system 1900. Scanner 944 is coupled via Cable 131 to a first connector of Y-adapter 170, which mounts onto system unit 110 via a second connector. Y-adapter 170 communicates with any of wireless peripherals 154, 510, 520, 530, and 540 at least in part via wireless transmissions 500, as before. Keyboard 930 is wireless, communicating with Y-adapter 170 at least in part via wireless transmissions 955. In a first variation of the illustrative embodiment of FIG. 9, wireless scanner 154 is an optical reader for printed codes, such as bar codes. In a second variation of the illustrative embodiment of FIG. 9, wireless scanner 154 is a radio frequency reader for RFID tags.

CONCLUSION

The invention is not limited to the foregoing illustrative embodiments. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. Also, unless specifically stated to the contrary, the value ranges specified, the maximum and minimum values used, or other particular specifications (such as the quantity, type, and speed of processors and memory; interface bandwidths; the degree of redundancy for any particular component or module; the particular version of an interface standard or component; and the number of entries or stages in registers and buffers), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. An adapter, including:
   a keyboard connector to communicate with a keyboard;
   a system connector to communicate with a system unit;
   a wireless interface to communicate with a wireless peripheral;
   a serial interface coupled to the wireless interface;
   a switch having inputs coupled to the keyboard connector and to the serial interface, the switch having an output coupled to the system connector;
   wherein the switch couples the serial interface to the system connector when there is data activity from the wireless peripheral and couples the keyboard connector to the system connector when there is no data activity from the wireless peripheral, and
   wherein the interfaces and the switch are implemented within a common housing.

2. The adapter of claim 1, wherein the connectors are implemented within the common housing.

3. The adapter of claim 1, wherein the connectors are implemented separate from the common housing.

4. The adapter of claim 1, wherein the weight and shape of the adapter are suitable for direct suspended operation while inserted into a receptacle on the system unit.

5. The adapter of claim 1, wherein the housing is implemented using injection molded plastic, and the interfaces and the switch are embedded in the housing.

6. The adapter of claim 1, wherein the adapter is powered via the system connector.

7. The adapter of claim 1, wherein the adapter further includes a power connector to couple to a power supply.

8. The adapter of claim 1, wherein the serial interface is compatible with an AT keyboard interface.

9. The adapter of claim 1, wherein the keyboard connector is a female AT keyboard connector and the system connector is a male AT keyboard connector.

10. The adapter of claim 1, further including:
    a peripheral connector to communicate with a wired peripheral; and
    a protocol adapter to adapt the wired peripheral to be compatible with an AT keyboard interface.

11. The adapter of claim 10, wherein the wired peripheral includes an RS-232 interface.

12. The adapter of claim 1, wherein the wireless peripheral includes an optical based scan head.

13. The adapter of claim 1, wherein the wireless peripheral includes an RF based scan head.

14. An adapter, including:
    a keyboard connector to communicate with a keyboard;
    a system connector to communicate with a system unit;
    a wireless interface to communicate with a wireless peripheral;
    a packet-switched serial interface coupled to the wireless interface;
    a packet-switched serial hub having inputs coupled to the keyboard connector and to the packet-switched serial interface, and having an output coupled to the system connector; and
    wherein the interfaces and the hub are implemented within a common housing.

15. The adapter of claim 14, wherein the connectors are implemented within the common housing.

16. The adapter of claim 14, wherein the connectors are implemented separate from the common housing.

17. The adapter of claim 14, wherein the weight and shape of the adapter are suitable for direct suspended operation while inserted into a receptacle on the system unit.

18. The adapter of claim 14, wherein the housing is implemented using injection molded plastic, and the interfaces and the hub are embedded in the housing.

19. The adapter of claim 14, wherein the adapter is powered via the system connector.

20. The adapter of claim 14, wherein the adapter further includes a power connector to couple to a power supply.

21. The adapter of claim 14, wherein the packet-switched serial interface is compatible with a USB standard.

22. The adapter of claim 14, wherein the connectors are USB connectors.

23. The adapter of claim 14, further including:
a peripheral connector to communicate with a wired peripheral; and
a protocol adapter to adapt the wired peripheral to be compatible with a USB standard.

24. The adapter of claim 23, wherein the wired peripheral includes an AT keyboard compatible interface.

25. The adapter of claim 14, wherein the wireless peripheral includes an optical based scan head.

26. The adapter of claim 14, wherein the wireless peripheral includes an RF based scan head.

27. An adapter, including:
a peripheral connector to communicate with a wired peripheral;
a host connector to communicate with a computing host;
a wireless interface to communicate with a wireless peripheral;
a switch having inputs coupled to the peripheral connector and to the wireless interface, the switch having an output coupled to the host connector;
wherein the switch couples one of the peripheral connector and the wireless interface to the host connector in accordance with a predetermined criteria; and
wherein the connectors and the switch are implemented within a common housing.

28. The adapter of claim 27, wherein the weight and shape of the adapter are suitable for direct suspended operation while inserted into a receptacle on the computing host.

29. The adapter of claim 27, wherein the housing is implemented using injection molded plastic, and the interface and the switch are embedded in the housing.

30. The adapter of claim 27, wherein the adapter is powered via the host connector.

31. The adapter of claim 27, wherein the adapter further includes a power connector to couple to a power supply.

32. The adapter of claim 27, wherein the wired peripheral has an RS-232 interface.

33. The adapter of claim 27, wherein the computing host has an RS-232 interface.

34. The adapter of claim 27, wherein the wired peripheral is a wired scanner.

35. The adapter of claim 27, wherein the wired peripheral is a data collection device.

36. The adapter of claim 27, wherein the wireless peripheral is a wireless RFID reader.

37. The adapter of claim 27, wherein the wired peripheral is a wired scanner and the wireless peripheral is a wireless RFID reader.

38. The adapter of claim 27, wherein the predetermined criteria is existence of data activity from the wireless peripheral.

39. The adapter of claim 38, wherein the switch couples the wireless interface to the host connector when there is data activity from the wireless peripheral and couples the peripheral connector to the host connector when there is no data activity from the wireless peripheral.

40. The adapter of claim 27, wherein the coupling between the wireless interface and the switch includes protocol conversion circuitry to adapt the wireless interface to a protocol compatible with the computing host.

41. The adapter of claim 27, wherein the wireless peripheral includes an optical based scan head.

42. The adapter of claim 41, wherein the scan head is adapted to scan bar codes.

43. The adapter of claim 41, wherein the scan head includes a laser scanner.

44. The adapter of claim 41, wherein the scan head includes a one-dimensional CCD array.

45. The adapter of claim 41, wherein the scan head includes a two-dimensional CCD array.

46. The adapter of claim 27, wherein the wireless peripheral includes an RF based scan head.

47. The adapter of claim 46, wherein the scan head is adapted to scan RFID tags.

48. The adapter of claim 46, wherein the scan head is adapted to scan inductively.

49. The adapter of claim 46, wherein the scan head is adapted to scan via perturbated reflected RF energy.

50. The adapter of claim 46, wherein the scan head is adapted to scan via microwave backscatter.

* * * * *